United States Patent
Xu et al.

(10) Patent No.: US 9,002,206 B2
(45) Date of Patent: Apr. 7, 2015

(54) WAVELENGTH BASED OPTICAL POWER POSITIONING FOR INFORMATION AND COMMUNICATIONS TECHNOLOGY SYSTEMS

(75) Inventors: Qing Xu, Montreal (CA); Robert Brunner, Montreal (CA); Stephane Lessard, Mirabel (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 311 days.

(21) Appl. No.: 13/545,200

(22) Filed: Jul. 10, 2012

(65) Prior Publication Data

US 2014/0016934 A1    Jan. 16, 2014

(51) Int. Cl.
 *H04B 10/564* (2013.01)
 *H04B 10/50* (2013.01)
 *H04B 10/80* (2013.01)
 *H04J 14/02* (2006.01)

(52) U.S. Cl.
 CPC .............. *H04B 10/801* (2013.01); *H04J 14/02* (2013.01); *H04J 14/0221* (2013.01)

(58) Field of Classification Search
 CPC ............................ H04B 10/506; H04B 10/564
 USPC .......................................... 398/81–82, 91–92
 See application file for complete search history.

(56) References Cited

U.S. PATENT DOCUMENTS

| | | | |
|---|---|---|---|
| 2003/0002776 A1 | 1/2003 | Graves et al. | |
| 2008/0063397 A1* | 3/2008 | Hu et al. | 398/43 |
| 2009/0202245 A1* | 8/2009 | Bouda | 398/76 |
| 2012/0294614 A1* | 11/2012 | Cvijetic et al. | 398/67 |

* cited by examiner

*Primary Examiner* — Leslie Pascal
(74) *Attorney, Agent, or Firm* — Murphy Bilak & Hommiller, PLLC (57) ABSTRACT

Wavelength-based optical power provisioning is provided by multiplexing a plurality of continuous wave light beams at different wavelengths onto a single optical fiber as a multiplexed light source and demultiplexing the multiplexed light source based on wavelength at a photonic unit coupled to the optical fiber to recover the continuous wave light beams. The recovered continuous wave light beams are split into a plurality of light beams by the photonic unit, each light beam having the same wavelength and the same or lower power as one of the recovered continuous wave light beams so that at least one of the light beams generated by the photonic unit has a higher power than the other light beams generated by the photonic unit.

18 Claims, 8 Drawing Sheets

WAVELENGTH BASED OPTICAL POWER POSITIONING FOR INFORMATION AND COMMUNICATIONS TECHNOLOGY SYSTEMS

TECHNICAL FIELD

The present invention generally relates to information and communications technology systems, and more particularly relates to wavelength based optical power provisioning for information and communications technology systems.

BACKGROUND

Chassis for conventional information and communications technology (ICT) systems include linecards which typically have separate modules enabled by an optical interface. The modules can be optically interconnected to establish an ultra-high speed data exchange link. Light source provisioning for the optical channels on a linecard is enabled by external laser arrays via an optical frontplate. The frontplate is equipped with optical I/O (input/output) ports for aggregated optical channels. Each linecard is inserted into an electrical backplane to access the backplane low-speed control unit, power management and power supply. High speed data transmission is enabled via the optical frontplate. The optical I/O channels from the frontplate can be connected, via a fiber cable, to another linecard in the same chassis, or connected to an optical cross connect (OXC) unit in the chassis. Additional ports in the OXC units can establish inter-chassis optical interconnects. Based on the system link requirements, the optical I/O channels should be designed to interconnect at various hierarchy levels such as module to module on the same linecard, linecard to linecard in the same chassis, linecard to OXC (optical cross-connect unit) to linecard in the same chassis, and chassis to chassis. The reach range can vary from millimeter (mm) to kilometer (km).

With regard to system cost, power consumption and scalability consideration, the use of optical amplifiers in such systems is preferably minimized. Consequently, the optical link power budget is a factor that depends on each specific interconnection requirement, which is typically limited by fiber and waveguide propagation loss, photonics device insertion losses such as couplers and modulators, as well as additional losses in intermediate routers and switches. Typically, a longer reach link with more photonics devices has higher optical loss and requires a higher link budget.

Silicon photonic based optical interconnects offer various advantages for ICT systems. However, thermal issues on high density linecards are a major concern for the monolithic integration of electronics and photonics. From a system deployment and maintenance perspective, efficient equipment installation procedure, device replacement and redundancy requirements favor external laser arrays as the light source provision solution. Furthermore, due to propagation and insertion loss induced by the optical fibers, waveguides, and other passive and active photonics devices, the optical link budget for different types of interconnects can vary from 0 to 30 dB. It is neither necessary nor cost effective to use excessive high power light sources for very short links. On the other hand, the minimum power budget should be met for each link. It is preferable to use standard integrated laser arrays for diverse optical interconnects scenarios to achieve a power efficient and cost effective solution.

Standard integrated laser arrays can meet the needs of diverse optical interconnect scenarios. However using homogenous laser arrays with the same wavelength requires a large number of optical fibers and connectors for light provision and interconnects. Another constraint in such systems is that the switches/routers can only be realized with a mesh topology network or active optical switching devices. Consequently, component count, installation/maintenance cost, and power consumption scale with the number of interconnected modules and linecards which becomes problematic for high capacity systems. Therefore a reach-adaptive power provision solution is desirable which uses standard integrated laser arrays in ICT systems.

SUMMARY

Embodiments described herein provide a WDM (wavelength division multiplexing) based light source distribution scheme that adjusts the individual channel power provision based on interconnect range and scale. WDM significantly improves system connectivity since one fiber/waveguide can carry multiple channels with different wavelengths simultaneously. Furthermore, integration of multi-wavelength laser arrays and cost-effective silicon photonic devices enable WDM-based short reach interconnects, providing increased channel capacity and lowering system cost. WDM also enables wavelength-dependent routing by using passive devices such an arrayed-waveguide-grating-router (AWGR). In one embodiment, a photonic unit is provided that includes a demultiplexer and power splitters for each wavelength. Optical power is supplied to each channel according to the required link budget at a designated wavelength, resulting in a cost effective and power efficient light distribution solution. A wavelength-based routing scheme is also provided for module-to-module, linecard-to-linecard and chassis-to-chassis interconnects.

According to an embodiment of a chassis, the chassis comprises a light source and a photonic unit. The light source is operable to multiplex a plurality of continuous wave light beams at different wavelengths onto a single optical fiber as a multiplexed light source. The photonic unit comprises an optical demultiplexer and a plurality of optical splitters. The optical demultiplexer is operable to demultiplex the multiplexed light source carried over the optical fiber based on wavelength to recover the continuous wave light beams. Each optical power splitter is operable to input one of the recovered continuous wave light beams from the optical demultiplexer and output one or more light beams at the same wavelength and at the same or lower power as the light beam input to that optical splitter so that at least one of the light beams output by the optical splitters has a higher power than the other light beams output by the optical splitters. The chassis can further include an optical component such as an AWGR to route light beams between photonic units on the same card or off the card based on wavelength.

According to an embodiment of a method of wavelength-based optical power provisioning, the method comprises: multiplexing a plurality of continuous wave light beams at different wavelengths onto a single optical fiber as a multiplexed light source; demultiplexing the multiplexed light source based on wavelength at a photonic unit coupled to the optical fiber to recover the continuous wave light beams; and splitting the recovered continuous wave light beams into a plurality of light beams by the photonic unit, each light beam having the same wavelength and the same or lower power as one of the recovered continuous wave light beams so that at least one of the light beams generated by the photonic unit has a higher power than the other light beams generated by the photonic unit. The method can further comprise directing the light beams between photonic units on the same card or off the card based on wavelength by an optical component such as an AWGR.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Figure 1:
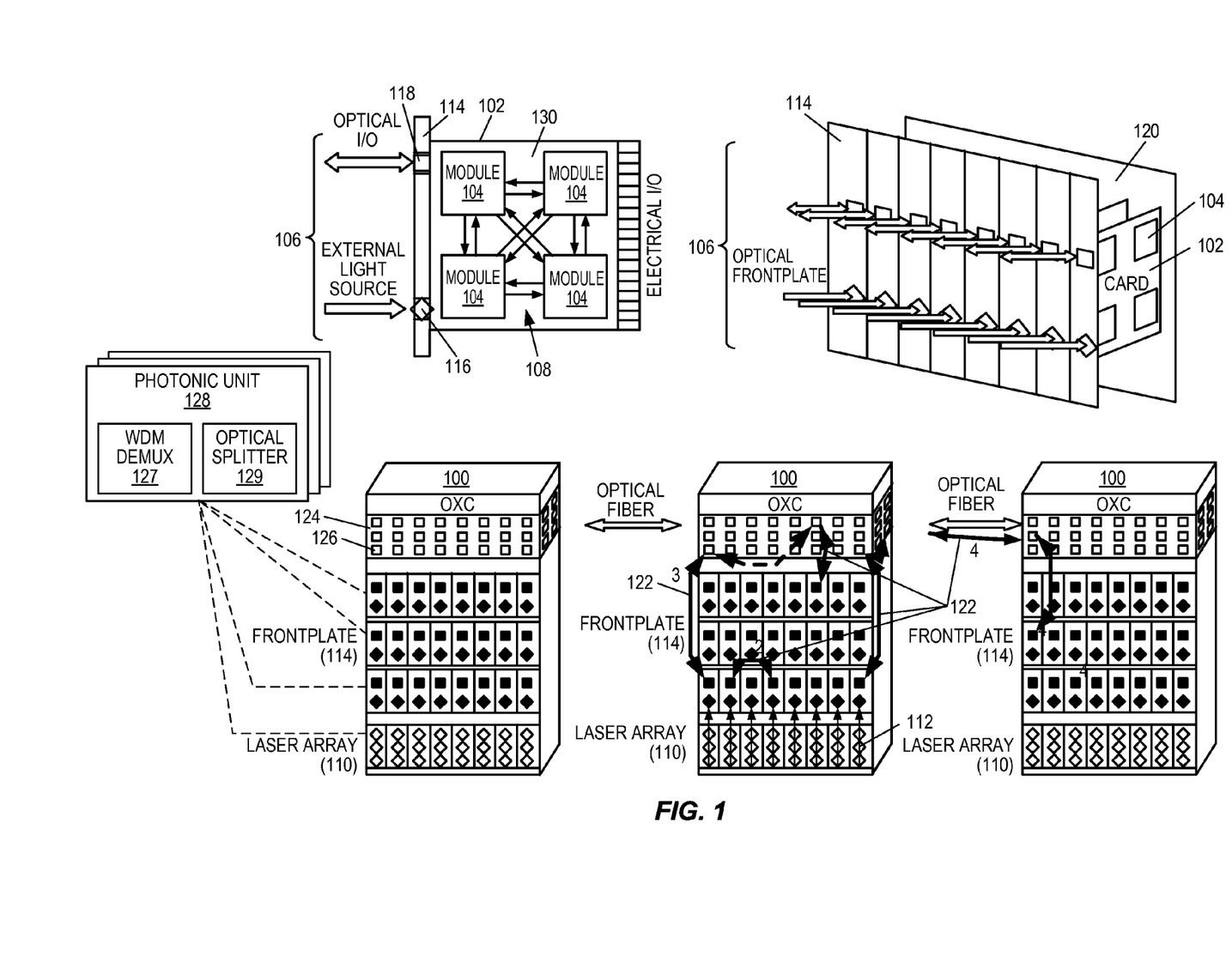
FIG. 1 is a diagram of an embodiment of a chassis which provides wavelength based optical power provisioning and wavelength-dependent routing in an ICT system.
Figure 2:
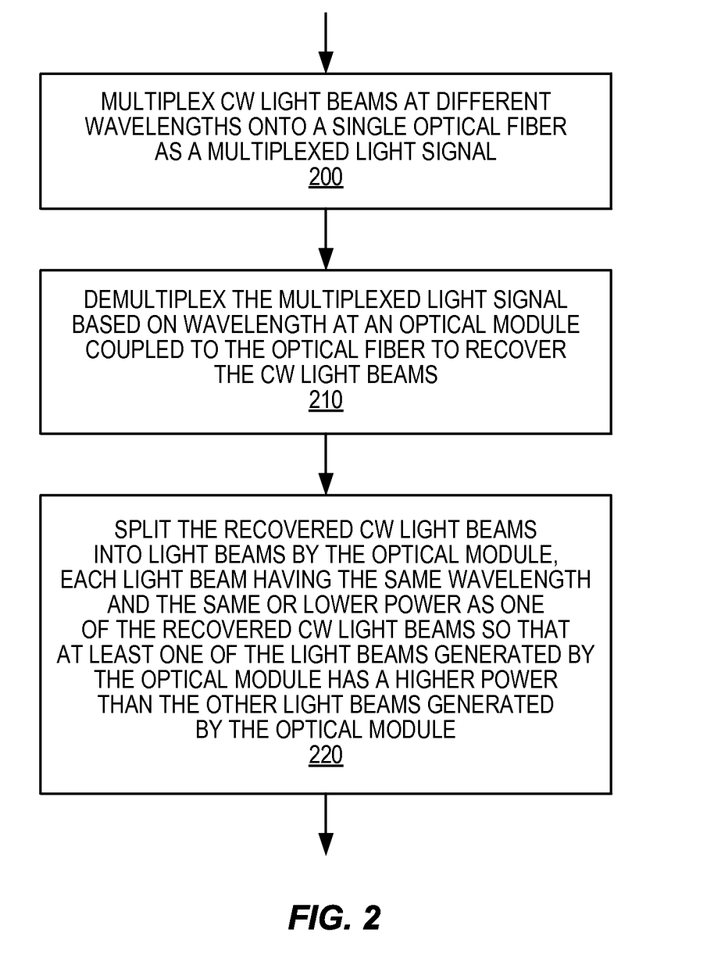
FIG. 2 is a flow diagram of an embodiment of a method of wavelength based optical power provisioning in an ICT system.

As a non-limiting example, FIG. 1 illustrates an embodiment of chassis 100 for use in ITC systems. The chassis 100 includes linecards 102 which have separate modules 104 enabled by an optical interface 106. The modules 104 can be optically interconnected to establish an ultra-high speed data exchange link. Light source provisioning for the optical channels 108 on a linecard 102 is enabled by laser arrays 110 included in the chassis 100. Each laser array 110 functions as a light source and includes a plurality of continuous wave (CW) lasers and a WDM multiplexer operable to multiplex CW light beams generated by the lasers at different wavelengths onto a single optical fiber 112 as a multiplexed light source (Step 200, FIG. 2). Each linecard 102 has an optical frontplate 114 equipped with optical I/O (input/output) ports 116, 118 for aggregated optical channels. Each linecard 102 is inserted into an electrical backplane 120 to access a backplane low-speed control unit, power management and power supply (not shown). High speed data transmission is enabled via the optical frontplate 114. The optical I/O channels from the frontplate 114 can be connected via a fiber cable 122 to another linecard 102 in the same chassis 100, or connected to an optical cross connect (OXO) unit 124 in the chassis 100. Some ports 126 in the OXC units 124 establish intra-chassis optical interconnects and other ports support inter-chassis optical interconnects. The optical I/O channels of the chassis 100 can form interconnects at various hierarchy levels such as module-to-module on the same linecard 102, linecard-to-linecard in the same chassis 100, linecard-to-OXC unit-to-linecard in the same chassis 100, and chassis-to-chassis.

The chassis 100 implements a WDM-based light source distribution scheme that adjusts the individual channel power provision based on interconnect range and scale. To this end, the chassis 100 includes a plurality of photonic units 128 which adjust the individual channel power provision based on wavelength so that different interconnect ranges and scales can be supported by the chassis 100. Each photonic unit 128 includes an optical WDM demultiplexer 127 operable to demultiplex the multiplexed light source carried over the optical fiber based on wavelength to recover the CW light beams (Step 210, FIG. 2). Each photonic unit 128 also includes a plurality of optical power splitters 129. Each optical splitter 129 is operable to input one of the recovered CW light beams from the optical demultiplexer 127 and output one or more light beams at the same wavelength and at the same or lower power as the light beam input to that optical splitter 129 so that at least one of the light beams output by the optical splitters 129 has a higher power than the other light beams output by the optical splitters 129 (Step 220, FIG. 2), thereby providing a wavelength-based light source distribution scheme that adjusts the individual channel power provision based on interconnect range and scale.

Figure 3:
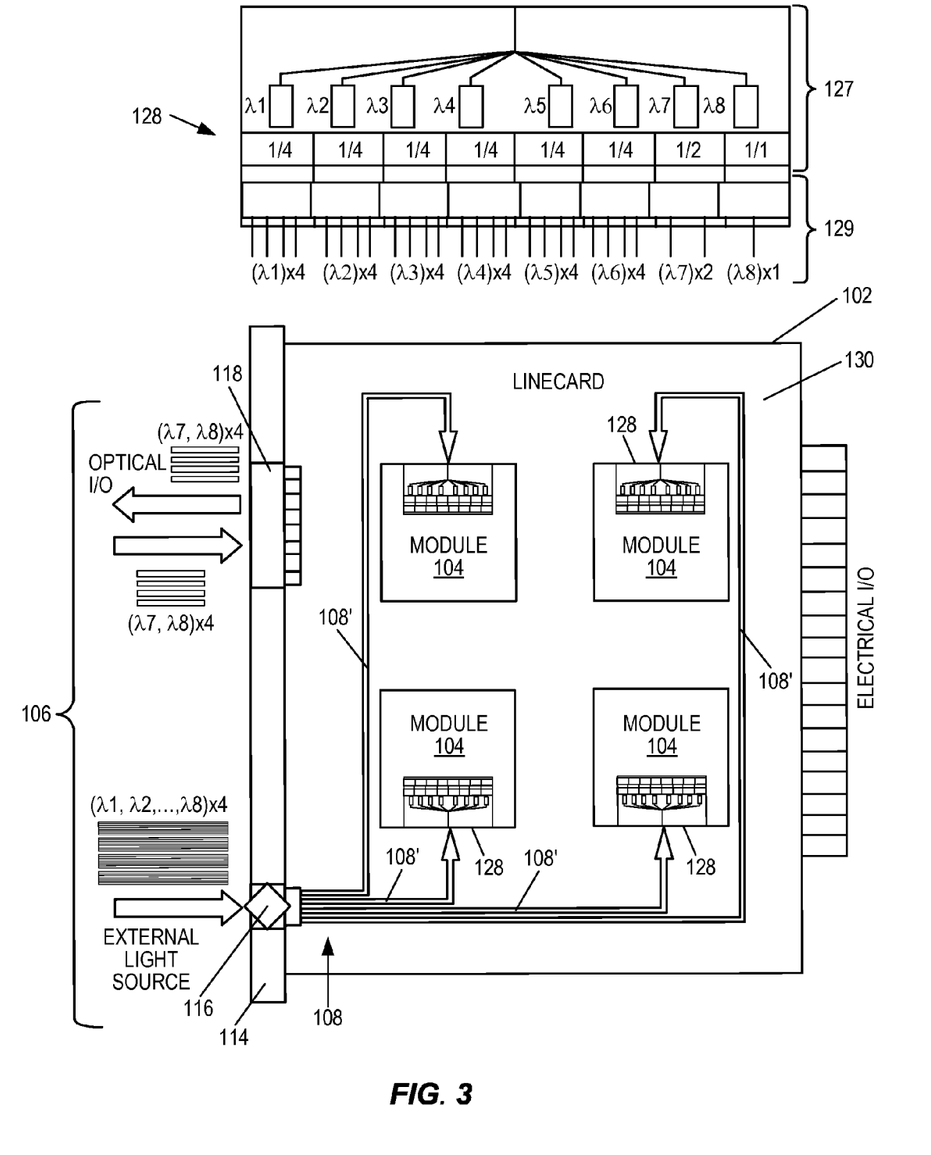
FIG. 3 is a diagram of an embodiment of a photonic unit with a demultiplexer and a plurality of optical splitters which provides wavelength based optical power provisioning in an ICT system.

FIG. 3 illustrates an embodiment of the photonic units 128. According to this embodiment, the photonic units 128 are integrated with the modules 104 of the linecards 102. A waveguide 108 carries the multiplexed light source from the input port 116 of the frontplate 114 of the linecard 102 to the photonic units 128. For example, the linecards 102 have four modules 104 in FIG. 3. Four input fibers 108' carry the different wavelength components (e.g. λ1, λ2, λ3, λ4, λ5, λ6, λ7, λ8) of the multiplexed light source to the respective photonic units 128 for optical power provision. Of course, the linecards 102 may include more or less than four modules 104.

In each case, a photonic unit 128 is included on each module 104 according to this embodiment. The demultiplexer 127 of each photonic unit 128 separates (demultiplexes) the multiplexed light source based on wavelength, and forwards each wavelength component to a dedicated power splitter 129. The power splitting ratio of each splitter 129 is programmable according to the link budget. In this specific example, the first six wavelengths (λ1, λ2, λ3, λ4, λ5, λ6) are reserved for internal module-to-module interconnects and are split by a ratio of ¼ the input power. Wavelengths λ7 and λ8 are reserved for linecard-to-linecard and chassis-to-chassis interconnects with higher link budgets, and have splitting ratios of ½ and 1, respectively. In general, at least one of the optical splitters 129 outputs a single higher-power light beam at the same wavelength and power as the light beam input to that optical splitter 129 for longer reach optical communication (e.g. linecard-to-linecard or chassis-to-chassis), and remaining ones of the optical splitters 129 each output a plurality of lower-power light beams at the same wavelength and lower power than the light beam input to that optical splitter 129 for shorter reach optical communication (e.g. module-to-module). The power and number of the light beams output by each optical splitter 129 can be changed or reconfigured as a function of wavelength e.g. by changing the refractive index of the coupling waveguides included in the splitters 129, changing the coupling length for adjacent ones of the splitter waveguides and/or changing the coupling gap between adjacent ones of the splitter waveguides. Instead of being integrated with the modules 104 on the linecards 102, the photonic units 128 can be integrated with the laser arrays 110 or as separate components as indicated by the dashed lines in FIG. 1.

Figure 4:
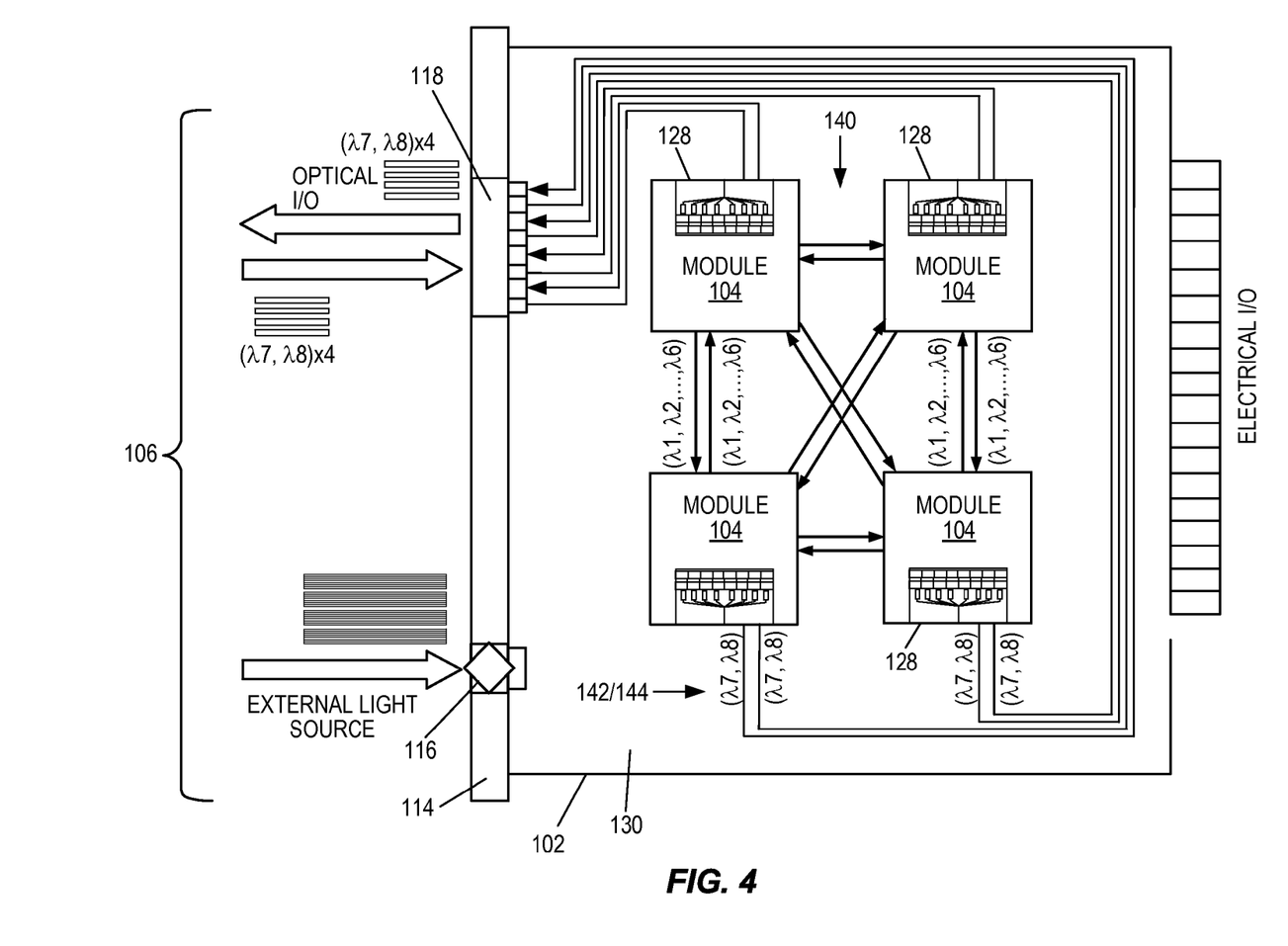
FIG. 4 is a diagram of an embodiment of a photonic unit with a demultiplexer and a plurality of optical splitters which provides wavelength based optical power provisioning and wavelength-dependent routing in an ICT system.

FIG. 4 illustrates an exemplary embodiment where the modules 104 on the same linecard 102 are interconnected with a mesh topology using wavelengths (e.g. low power wavelengths $\lambda 1, \lambda 2, \lambda 3, \lambda 4, \lambda 5, \lambda 6$). For this configuration, 24 total I/O channels 140 can be established between each two modules 104. Wavelength $\lambda 7$ is reserved for linecard-to-linecard interconnects in this embodiment, and a maximum number of 2 I/O channels 142 can be established for each module 104 to output over the output port 118 of the card frontplate 114. Wavelength $\lambda 8$ without power splitting (full power) is dedicated to support 1 I/O channel 144 for the longest reach with highest link budget in this embodiment, such as chassis-to-chassis interconnects. The exemplary power splitting and wavelength management described above is not exclusive and each linecard 102 can be customized as demanded. However, the external light source provision from the laser arrays 110 is the same for each linecard 102. Several laser units within the arrays 110 can be deactivated for energy saving if unused. Some of the wavelengths or additional wavelengths can also be used for redundancy. The power splitters 129 can be reconfigurable for power redistribution and management flexibility.

Figure 5A:
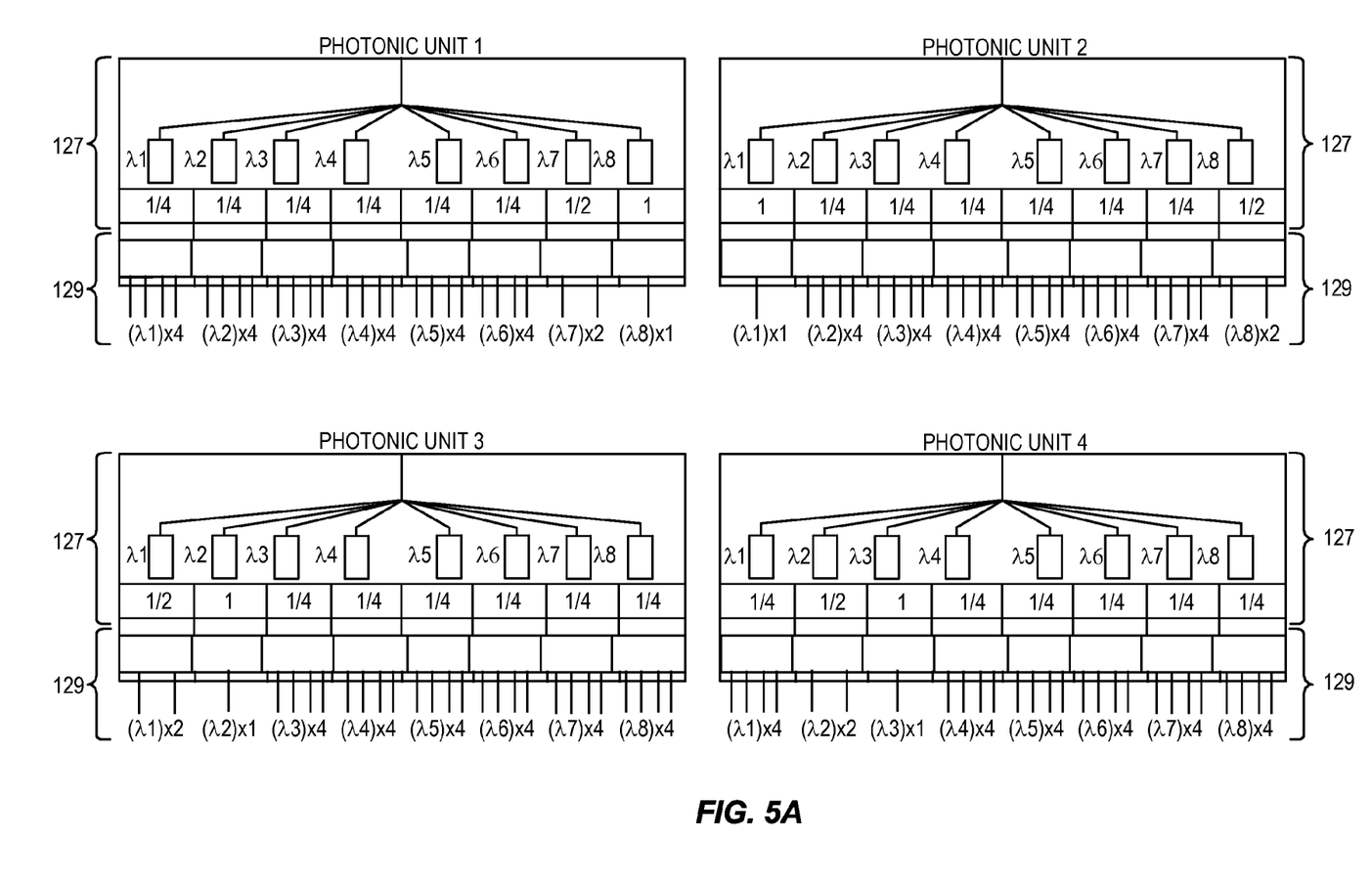
FIGS. 5A and 5B present an embodiment of a plurality of photonic units on the same card for provisioning power and routing optical signals based on wavelength.
Figure 5B:
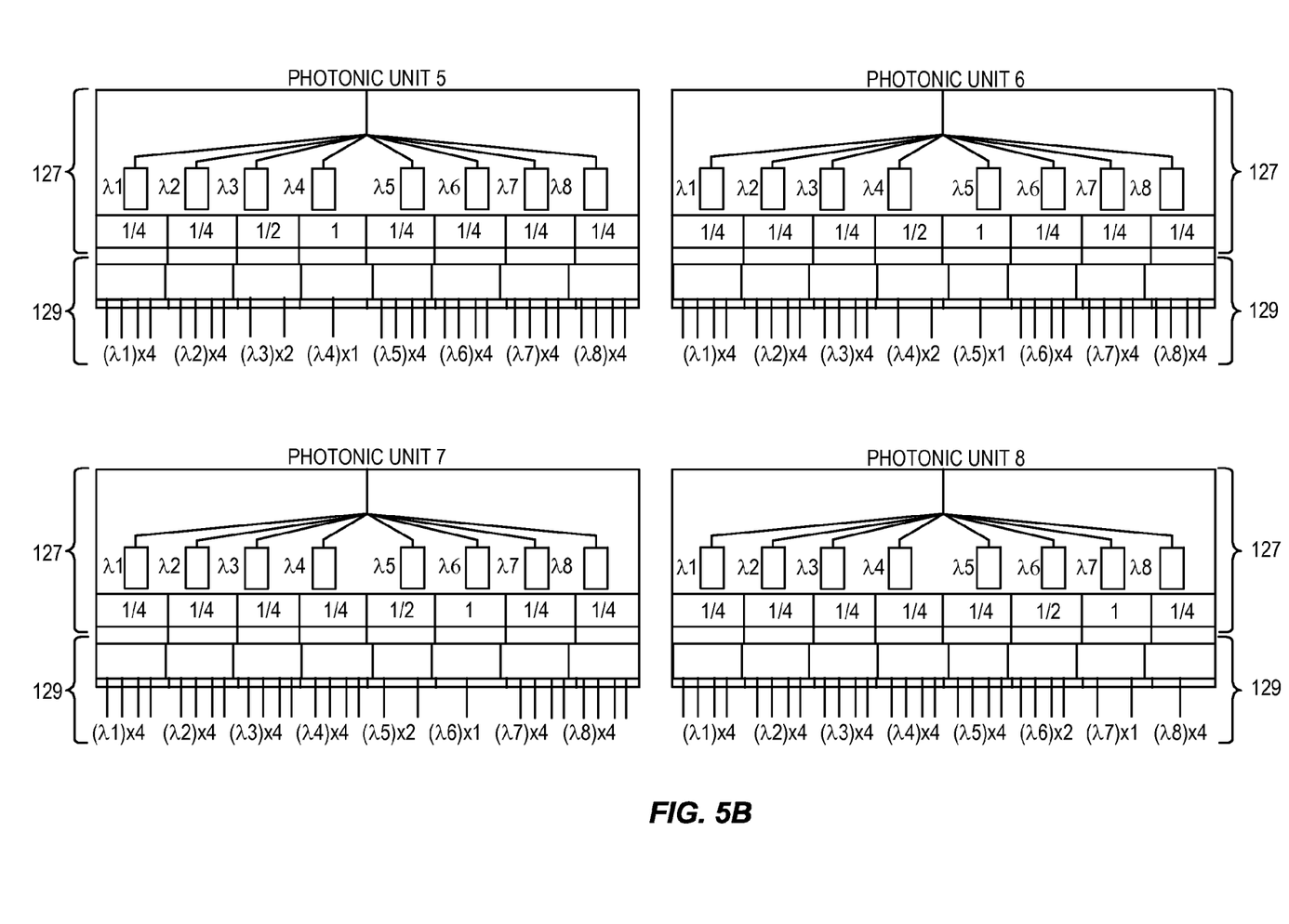

FIGS. 5A and 5B illustrate an embodiment of the photonic units 128 on the same linecard 102 for provisioning optical power differently based on wavelength so that the highest-power light beam output by one of the optical splitters 129 of one photonic unit 128 has a different wavelength than the highest-power light beam output by one of the optical splitters 129 of a different photonic unit 128 on the same linecard 102. In this exemplary embodiment, eight patterns of wavelength rotation and power splitting are provided. In this example, each module 104 can have different egress/ingress channel wavelength distributions to facilitate wavelength-based routing. For example, photonic unit 1 splits wavelengths $\lambda 1, \lambda 2, \lambda 3, \lambda 4, \lambda 5$, and $\lambda 6$ each into four beams of ¼ power each for short reach optical communication, wavelength $\lambda 7$ into two beams of ½ power each for intermediate reach optical communication, and wavelength $\lambda 8$ into a single beam at full (input) power for long reach optical communication. Photonic unit 2 splits wavelengths $\lambda 2, \lambda 3, \lambda 4, \lambda 5, \lambda 6$, and $\lambda 7$ each into four beams of ¼ power each for short reach optical communication, wavelength $\lambda 8$ into two beams of ½ power each for intermediate reach optical communication, and wavelength $\lambda 1$ into a single beam at full (input) power for long reach optical communication, etc.. This way, power provisioning is distributed over wavelength. The power splitters 129 included in each photonic unit 128 can be reconfigurable based on the reach and required number of channels.

In addition to providing channel power provisioning based on wavelength, the photonic units 128 can also route the light beams over different distances based on wavelength as shown in FIG. 4. For example, each higher-power light beam output by the optical splitters 129 can be routed off the linecard 102 e.g. to another linecard 102 within the same chassis 100 or to a linecard 102 in a different chassis 100. Each lower-power light beam output by the optical splitters 129 is routed to another photonic unit 128 on the same linecard 102. This optical signal routing is done based on wavelength. To this end, the photonic units 128 also include an optical component for directing light beams between photonic units 128 on the same linecard 102 or off the linecard 102 based on wavelength. In one embodiment, the optical component is a 1×N optical multiplexer that provides a single trunk line from each photonic unit 128 on the same linecard 102. In another embodiment, the optical component is an arrayed waveguide grating router (AWGR) that routes light beams between photonic units 128 on the same linecard 102 or off the linecard 102 based on wavelength.

An AWGR is a passive device that can route an optical beam from a given input port to a designated output port based on wavelength. An N×N AWGR can be realized by designing the free spectral range of the arrayed wave guide (AWG) to be N times the channel spacing. An N×N AWGR has a uniform-loss-cyclic-frequency property that can be exploited for wavelength-dependent routing.

Figure 6:
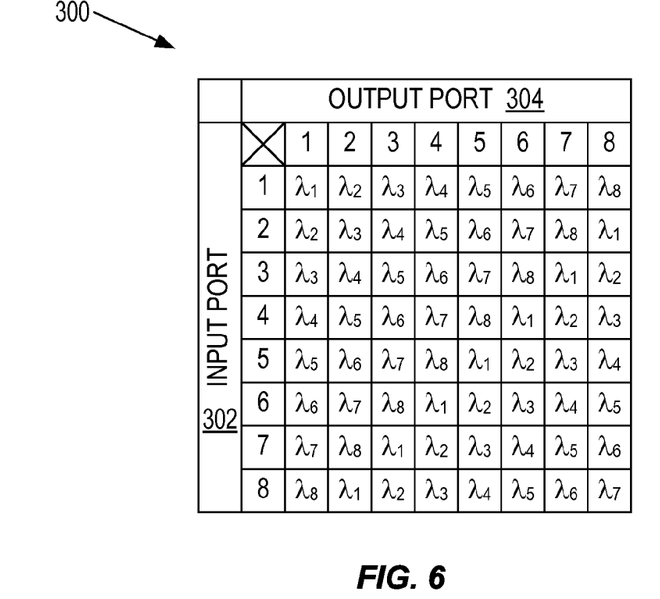
FIG. 6 is a diagram of an embodiment of an AWGR which provides wavelength based optical signal routing in an ICT system.

FIG. 6 illustrates an embodiment of the AWGR 300 implemented to support the eight wavelength example ($\lambda 1, \lambda 2, \lambda 3, \lambda 4, \lambda 5, \lambda 6, \lambda 7, \lambda 8$) described previously herein. In general, the AWGR 300 can support more or less than eight wavelengths. In each case, the AWGR 300 has a plurality of input ports 302 and a plurality of output ports 304. The AWGR 300 routes light beams between the input and output ports 302, 304 so that one or more wavelengths ingress each input port 302 and one or more wavelengths egress each output port 304. The AWGR 300 controls routing between the input and output ports 302, 304 based on wavelength. For example in FIG. 6, the AWGR 300 routes wavelength $\lambda 1$ from input port 1 to output port 1, from input port 2 to output port 8, from input port 3 to output port 7, etc. The AWGR 300 routes wavelength $\lambda 2$ from input port 1 to output port 2, from input port 2 to output port 1, from input port 3 to output port 8, etc. and so on for each combination of input port 302, output port 304 and wavelength. Each output port 304 of the AWGR 300 provides an optical link with equal channel power and different wavelengths from different photonic units 128 on the same linecard 102.

Figure 7:
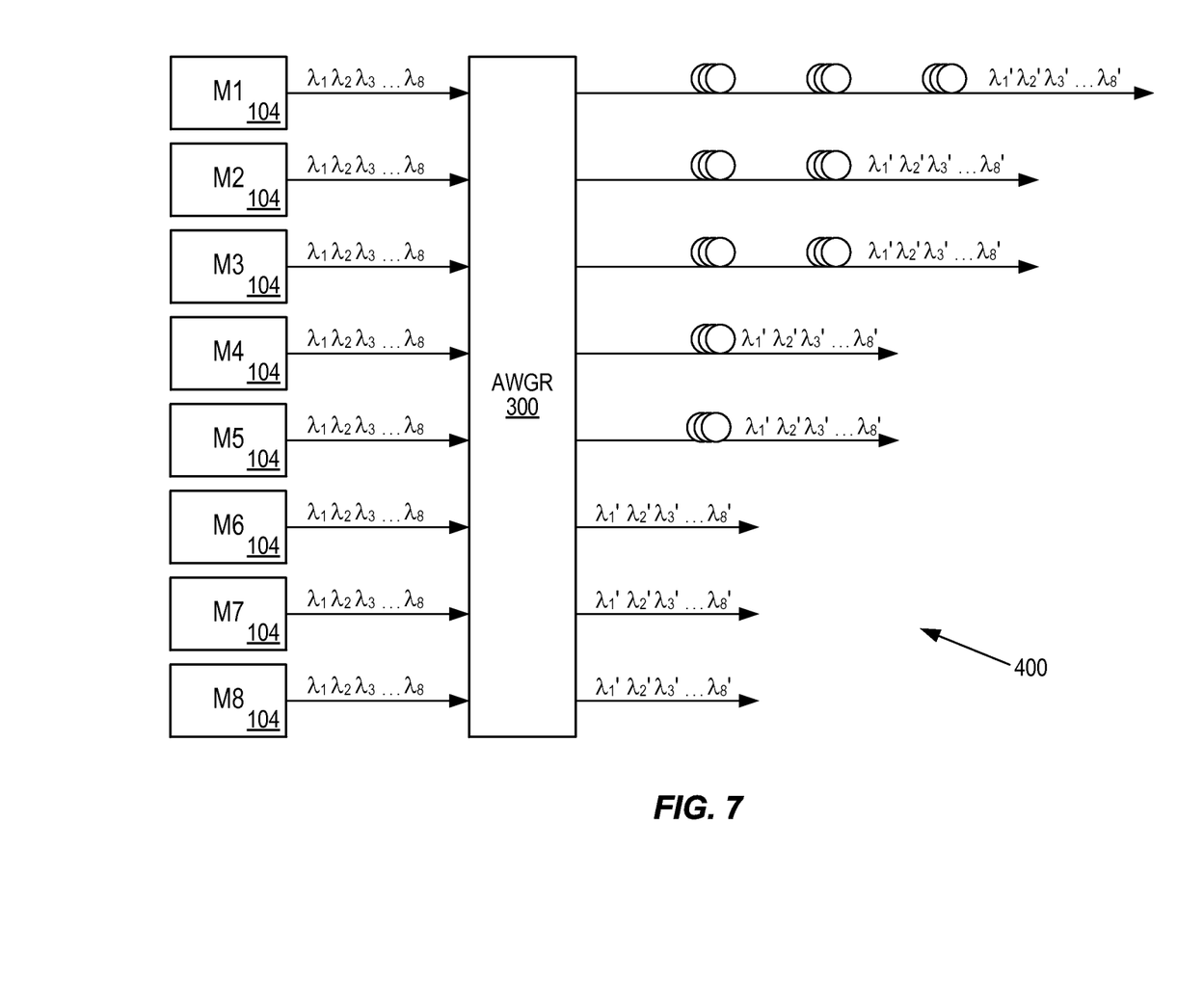
FIG. 7 is a diagram of an embodiment of an AWGR which routes optical signals from a plurality of optical modules to different length links based on wavelength.

FIG. 7 illustrates an embodiment where each output (right side) port of the AWGR 300 provides a link 400 with equal channel power level, containing different wavelengths from different modules 104. Although all the channels (wavelength elements) from the same egress link (optical fiber) 400 have the same power level, the power levels of each link 400 can be tuned by the power splitters 129 of the photonic units 128 to account for each link reach requirement e.g. as shown in FIGS. 5A and 5B so that some wavelengths output by each photonic unit 128 are lower power and other wavelength(s) output by the same photonic unit 128 are higher power. The AWGR 300 routes the light signals based on wavelength, input port and output port as described above so that all wavelengths of the same lower power are combined and reserved for internal module-to-module interconnects and all wavelength(s) of the same higher power are combined and reserved for external module-to-module and/or chassis-to-chassis interconnects. In another embodiment, more than one AWGR with the same or different number of ports can be used in order to provide a higher capacity and more flexible wavelength-dependent routing scheme. In another embodiment, a 1×N multiplexer (MUX) can be used instead of an AWGR in order to provide a single trunk line from each MUX unit. In each embodiment, a de-multiplexer is provided at the receiver side to separate each channel (wavelength). Consequently, multiple wavelength light sources, variable power splitters, and the use of AWGRs can provide a versatile and flexible wavelength-based reach-adaptive optical power provision solution.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A linecard, comprising:
an external light source port operable to input a multiplexed light source wherein the multiplexed light source comprises a plurality of continuous wave light beams at different wavelengths; and
a photonic unit comprising:
an optical demultiplexer operable to demultiplex the multiplexed light source based on wavelength to recover the continuous wave light beams; and
a plurality of optical power splitters each operable to input one of the recovered continuous wave light beams from the optical demultiplexer and output one or more light beams at the same wavelength and at the same or lower power as the light beam input to that optical splitter so that at least one of the light beams output by the optical splitters has a higher power than the other light beams output by the optical splitters,
wherein the photonic unit is operable to route one or more higher-power ones of the light beams output by the optical splitters off the linecard and one or more lower-power ones of the light beams output by the optical splitters to another photonic unit on the same linecard based on wavelength.

2. The linecard according to claim 1, further comprising a waveguide operable to carry the multiplexed light source to the photonic unit.

3. The linecard according to claim 1, wherein at least one of the optical splitters is operable to output a single higher-power light beam at the same wavelength and power as the light beam input to that optical splitter, and remaining ones of the optical splitters are each operable to output a plurality of lower-power light beams at the same wavelength and lower power than the light beam input to that optical splitter.

4. The linecard according to claim 3, wherein one of the remaining ones of the optical splitters is operable to input one of the recovered continuous wave light beams and output two lower-power light beams at the same wavelength and half the power as the light beam input to that optical splitter.

5. The linecard according to claim 3, wherein one of the remaining ones of the optical splitters is operable to input one of the recovered continuous wave light beams and output four lower-power light beams at the same wavelength and quarter the power as the light beam input to that optical splitter.

6. The linecard according to claim 1, wherein the optical splitters are reconfigurable so that the power and number of the light beams output by each optical splitter can be changed as a function of wavelength.

7. The linecard according to claim 1, comprising a plurality of the photonic units, wherein the photonic units are operable to provision optical power differently based on wavelength so that the highest-power light beam output by one of the optical splitters of one photonic unit has a different wavelength than the highest-power light beam output by one of the optical splitters of a different photonic unit.

8. The linecard according to claim 1, further comprising an optical component operable to direct light beams between photonic units on the linecard or to another linecard based on wavelength.

9. The linecard according to claim 8, wherein the optical component is a 1×N optical multiplexer operable to provide a single trunk line from each photonic unit on the linecard.

10. The linecard according to claim 8, wherein the optical component is an arrayed waveguide grating router (AWGR) operable to route light beams between photonic units on the linecard or to another linecard based on wavelength.

11. The linecard according to claim 10, wherein the AWGR has a plurality of input ports and a plurality of output ports and routes light beams between the input and output ports so that one or more wavelengths ingress each input port and one or more wavelengths egress each output port, and wherein the AWGR is operable to control routing between the input and output ports based on wavelength.

12. The linecard according to claim 11, wherein each output port of the AWGR is operable to provide an optical link with equal channel power and different wavelengths from different photonic units.

13. A method of wavelength-based optical power provisioning comprising:
receiving a multiplexed light source comprising a plurality of continuous wave light beams at different wavelengths;
demultiplexing the multiplexed light source based on wavelength at a photonic unit disposed on a card, to recover the continuous wave light beams;
splitting the recovered continuous wave light beams into a plurality of light beams by the photonic unit, each light beam having the same wavelength and the same or lower power as one of the recovered continuous wave light beams so that at least one of the light beams generated by the photonic unit has a higher power than the other light beams generated by the photonic unit; and
routing one or more higher-power ones of the light beams generated by the photonic unit off the card and one or more lower-power ones of the light beams generated by the photonic unit to another photonic unit on the same card based on wavelength.

14. The method according to claim 13, further comprising provisioning optical power differently based on wavelength so that the highest-power light beam generated by one photonic unit on the card has a different wavelength than the highest-power light beam generated by a different photonic unit on the same card.

15. The method according to claim 13, further comprising directing light beams between photonic units on the same card or off the card based on wavelength.

16. The method according to claim 15, wherein the light beams are directed between photonic units on the same card or off the card based on wavelength by an arrayed waveguide grating router (AWGR).

17. The method according to claim 16, further comprising routing light beams between a plurality of input and output ports of the AWGR so that one or more wavelengths ingress each input port and one or more wavelengths egress each output port, and wherein the AWGR controls routing between the input and output ports based on wavelength.

18. The method according to claim 17, further comprising providing an optical link with equal channel power and different wavelengths from different photonic units on the same card via the AWGR.

\* \* \* \* \*